(12) United States Patent
Guermandi

(10) Patent No.: US 6,305,450 B1
(45) Date of Patent: Oct. 23, 2001

(54) TIRE WITH SPECIFIED BELT PROFILE IN THE ABSENCE OF LOAD AND INFLATING PRESSURE

(75) Inventor: Romano Guermandi, Milan (IT)

(73) Assignee: Pirelli Coordinamento Pneumatici S.p.A., Milan (IT)

( * ) Notice: Subject to any disclaimer, the term of this patent is extended or adjusted under 35 U.S.C. 154(b) by 0 days.

(21) Appl. No.: 08/951,672

(22) Filed: Oct. 16, 1997

(30) Foreign Application Priority Data

Oct. 18, 1996 (IT) ............................... MI96A2157

(51) Int. Cl.[7] ............................... B60C 3/00; B60C 3/06; B60C 9/18; B60C 11/00; B60C 11/24
(52) U.S. Cl. ..................... 152/154.2; 152/209.1; 152/209.5; 152/209.8; 152/209.18; 152/209.19; 152/209.26; 152/454; 152/526; 152/527; 152/531; 152/538; 264/326
(58) Field of Search ................ 152/209.26, 209.18, 152/209.19, 209.5, 209.1, 454, 538, 154.2, 526, 527, 531; 264/326

(56) References Cited

U.S. PATENT DOCUMENTS

| | | |
|---|---|---|
| 3,517,720 | 6/1970 | Brown . |
| 3,735,791 | 5/1973 | McKissick et al. . |
| 4,044,810 | 8/1977 | Taniguchi et al. . |
| 4,289,182 | 9/1981 | Sato et al. . |
| 4,687,037 | 8/1987 | Pfeiffer et al. . |
| 4,700,762 | 10/1987 | Landers . |
| 4,785,863 | 11/1988 | Tsuda et al. . |
| 4,796,683 | 1/1989 | Kawabata et al. . |
| 5,176,766 | 1/1993 | Landers et al. . |

FOREIGN PATENT DOCUMENTS

| | | |
|---|---|---|
| 36 15 426 A1 | 11/1987 | (DE) . |
| 0 503 404 A1 | 9/1992 | (EP) . |
| 0 503 405 A1 | 9/1992 | (EP) . |
| 0 503 406 A1 | 9/1992 | (EP) . |
| 0 615 866 A1 | 9/1994 | (EP) . |
| 0 667 251 A1 | 8/1995 | (EP) . |
| 7-285301 | 10/1995 | (JP) . |
| 87 499 A | 9/1989 | (LU) . |

*Primary Examiner*—Adrienne C. Johnstone
(74) *Attorney, Agent, or Firm*—Finnegan, Henderson, Farabow, Garrett & Dunner, L.L.P.

(57) ABSTRACT

A tire (1) for motor-vehicle wheels comprises a tread band (10) and a belt structure (6), the tread band being molded with a raised pattern having a circumferential groove (11). In the absence of load and inflating pressure, the tire is characterized in that the belt structure in a cross-section of the tire has an axial profile comprising three distinct portions, first (14) and second (15) side portions and one central portion (16) interposed between the side portions. The side portions are concave at a radially internal position, in which the concavity is defined for each portion by a respective center and a respective radius of curvature. The central portion is concave at a radially external position where the concavity center of the central portion lies in the center line plane of the circumferential groove, in which the depth of the radially external concavity is canceled under the effect of the normal inflating pressure of the tire.

13 Claims, 4 Drawing Sheets

TIRE WITH SPECIFIED BELT PROFILE IN THE ABSENCE OF LOAD AND INFLATING PRESSURE

BACKGROUND OF THE INVENTION

1. Field of the Invention

The present invention relates to a high-performance tire, which mitigates the aqua planing effect and increases wear-resistance, as well as to the manufacturing method and mold thereof.

More particularly, the tire of the invention is of the type comprising a tread band provided with at least one large-sized, extended circumferential cavity, preferably but not exclusively disposed at a central position, for quickly ejecting water collected on the ground so as to counteract the effect currently referred to as "aquaplaning". Aquaplaning occurs when a vehicle loses ground contact, particularly at high speed, due to the continuous water film interposed between the tire and the ground.

Tires of the above type, in which the tread substantially comprises two distinct axial portions separated from each other by a wide circumferentially-extended cavity, are well-known and have been described in several patents briefly mentioned hereinafter.

2. Description of the Related Art

For instance, patent EP 0 503 404 discloses a tread comprising circumferential and transverse S-shaped grooves, crossed with each other so as to form a plurality of blocks, and provided with a central cavity of a width corresponding to 10%–20% of the tread width and a depth corresponding to 78%–80% of the overall tread thickness.

Patent EP 0 503 405, in addition to the above, gives particular values for the angle of inclination of the entrance and exit walls of the blocks relative to the ground-contacting area. Patent EP 0 503 406 also illustrates particular connecting arcs of the side walls of the different tread band blocks.

Other details concerning the geometrical and operating features of the grooves and blocks in the tread pattern are described in U.S. Pat. Nos. 5,176,766; 4,700,762; and 4,785,863.

U.S. Pat. No. 4,796,683 refers to a tread pattern comprising a circumferentially-directed cavity and transverse grooves of great inclination to the cavity so as to promote water draining. In this tread pattern blocks are formed that have acute and obtuse angles. Close to the acute angles where stiffness is lower, the greatest abrasion can be found. Elimination of this drawback is suggested by forming particular chamfers in the blocks so as to increase the block stiffness at aimed areas. U.S. Pat. No. 4,289,182 refers to a motorcycle tire adapted for high speed and provided with a tread pattern having a circumferentially-directed cavity and two sets of rectilinear transverse grooves at each side of the cavity. Between the grooves of the two sets, a zigzag rib is formed.

The Applicant has noticed that the known tires of the above type generally exhibit a marked wear of the tread band at the central area thereof, close to the cavity along the equatorial plane, which takes place early and continues over time. The remaining tread portions outside of the central area exhibit slower wear, and therefore, the overall lifetime of the tire is reduced as compared to possible lifetime of an evenly wearing tire.

It is a current hypothesis that this type of wear depends on a greater flexibility and deformability of the carcass by effect of the wide central cavity in the tread pattern.

U.S. Pat. No. 4,687,037, directed to a tire comprising a carcass, a belt and a tread band having a circumferential cavity in the middle, the width of which corresponds to 20% of the tread width, attempts to find a solution to this problem by imparting a particular rigidity to the belt. Actually the belt comprises a plurality of reinforcing layers having cords crossed with each other following known techniques, partly substantially extended over the whole width of the tread band, and partly axially concentrated on given preferential areas.

In particular, the belt structure has four layers of mutually crossed cords of a width corresponding to the tread band width and two further reinforcing layers of a width as large as or slightly larger than the width of the central cavity. These further layers of reduced width are disposed below the cavity, the first layer between the two pairs of layers of a width as large as that of the tread band and the second layer immediately under the cavity, respectively.

Radially projecting outwardly from the cavity bottom, in such a manner as to nearly constitute a link between the two distinct tread band portions, there is a rib of elastomeric material extending over the whole cavity length.

SUMMARY OF THE INVENTION

The Applicant believes that the known solutions are not capable of providing an adequate solution to the problem because each is based on an incorrect perception. In particular, in accordance with the invention, it has been understood that said early and localized wear depended on the anomalous expansion of the belt at the central cavity, where this expansion was made possible by the reduced structural strength of the tread due to a lack of material at this area.

This expansion was not sufficiently inhibited by the addition of new belt layers because all layers are fairly expandible in a circumferential direction due to a rotation of the reinforcing cords in the lying plane of the cords themselves and due to the typical elasticity of the rubberizing material forming the layers.

In accordance with the present invention, the Applicant proposes to solve the problem by trying to achieve reinforcing-belt stability in the area of thinner tread below the cavity and exerting a control on the anomalous belt expansion. The resulting tire has a better performing tread band in terms of wear, and therefore the tire has a longer lifetime.

Accordingly, a first aspect the invention relates to a tire for motor-vehicle wheels comprising a toroidal carcass provided with axially opposite sidewalls and beads for anchoring the tire to a corresponding mounting rim, a tread band disposed crown-wise to said carcass and a belt structure interposed between said carcass and said tread band, axially extended in a continuous manner between the sidewalls, said tread band being molded with a raised pattern having at least one circumferential groove, characterized in that, in a non-operating condition, that is in the absence of load and inflating pressure, said belt structure, seen in right section in the plane containing the tire axis, has an axial profile comprising three distinct portions, two side portions and one central portion respectively, said central portion being interposed between said side portions, said side portions being concave at a radially internal position, in which the concavity is defined for each portion by a respective center and a respective radius of curvature, said central portion being concave at a radially external position, the concavity center of the central portion lying in the center line plane of the circumferential groove, in which the depth, S, of the outer concavity is capable of being canceled under the effect of the normal inflating pressure of the tire.

In a convenient embodiment of the invention, the center line plane of said groove is coincident with the equatorial plane of the tire.

Preferably in this case the depth S of said concavity is defined by the relation:

$$S = R_1 - R_0$$

wherein:

$R_1$ corresponds to the radius of a known tire as measured at the equatorial plane when the tire is mounted to the respective rim and inflated to the normal running pressure. This tire is identical in its structure and size to the tire of the present invention except for the fact that its belt structure under any condition and seen in right section exhibits a continuously concave profile in a radially internal position;

$R_0$ corresponds to the radius of the same known tire, still measured at the equatorial plane, under non-working conditions.

Therefore, the depth S of the concavity of the central portion is precisely the depth required to negate the expanding effect at the equatorial plane exhibited by known tires. Upon inflation of the tire of the present invention, the concavity of the central portion of Applicant's tire having a depth S is reversed to yield a profile substantially corresponding to a profile of the prior art tire under non-inflated conditions.

In a preferred embodiment, said circumferential groove comprises, in combination with the underlying belt concavity, reinforcing means of said tread band, preferably disposed in a central position relative to said groove, radially projecting from the bottom; still more preferably these means comprise a continuous circumferential rib, disposed at the center line plane of the groove, extended radially outwardly in cantilevered fashion from the groove bottom.

Conveniently, the ratio of the rib height to the groove depth along the center line plane is included between 0.2 and 0.5.

The performance of the invention improves as the size of the groove increases and as the thickness of the elastomeric material at the groove decreases. Therefore, preferably the thickness of said tread band at the center line plane of the groove is included between 1 and 3.5 mm, and the ratio of the groove depth to the thickness of the underlying portion of the band is between 2.0 and 10.

Another aspect the invention relates to a process for manufacturing a tire comprising a toroidal carcass provided with axially opposite sidewalls and beads for anchoring said tire to a corresponding mounting rim, a tread band disposed crown-wise to said carcass and a belt structure interposed between said carcass and tread band, axially extending in a continuous manner between said sidewalls, said tread band being molded with a raised pattern provided with at least one circumferential groove, said process comprising the step of disposing the green tire, in a toroidal conformation, in a vulcanization mold to achieve its final molding configuration by means of a heat treatment at high temperature and with the use of fluid under pressure, characterized by utilizing a mold forcing said belt structure to take a molding configuration the profile of which, seen in right section in the plane containing the tire axis, comprises three distinct portions, i.e. two side portions, respectively referred to as first and second portions, and one third portion, the central one, interposed between said side portions in register with said circumferential groove, said side portions being concave in a radially internal position, in which the concavity is defined for each portion by a respective center and a respective radius of curvature, said central portion being concave in a radially external position, the depth of said radially external portion being capable of being canceled under the effect of the normal inflating pressure of the tire.

In still another aspect, the invention relates to a mold for tire vulcanization, comprising axially opposite sidewalls and a tread band molded with a raised pattern formed with at least one circumferential groove, said mold comprising a pair of axially opposite cheeks corresponding to the sidewalls of said tire and a matrix interposed between said cheeks, corresponding to said tread band, said matrix being provided with a plurality of ribs projecting in a raised configuration from a bottom surface for forming said pattern, characterized in that, in a plane containing the mold axis, the sectional profile of said bottom surface comprises two distinct concave side portions, in which the concavity is defined for each portion by a respective center and a respective radius of curvature, and the sectional profile of the surface tangent to the ridge of said ribs in the area included between said side portions has a convexity directed radially inwardly.

BRIEF DESCRIPTION OF THE DRAWINGS

The present invention will be better understood with the aid of the following description and the accompanying drawings exclusively given by way of non-limiting example, in which.

DETAILED DESCRIPTION OF THE PREFERRED EMBODIMENTS

Figure 1:
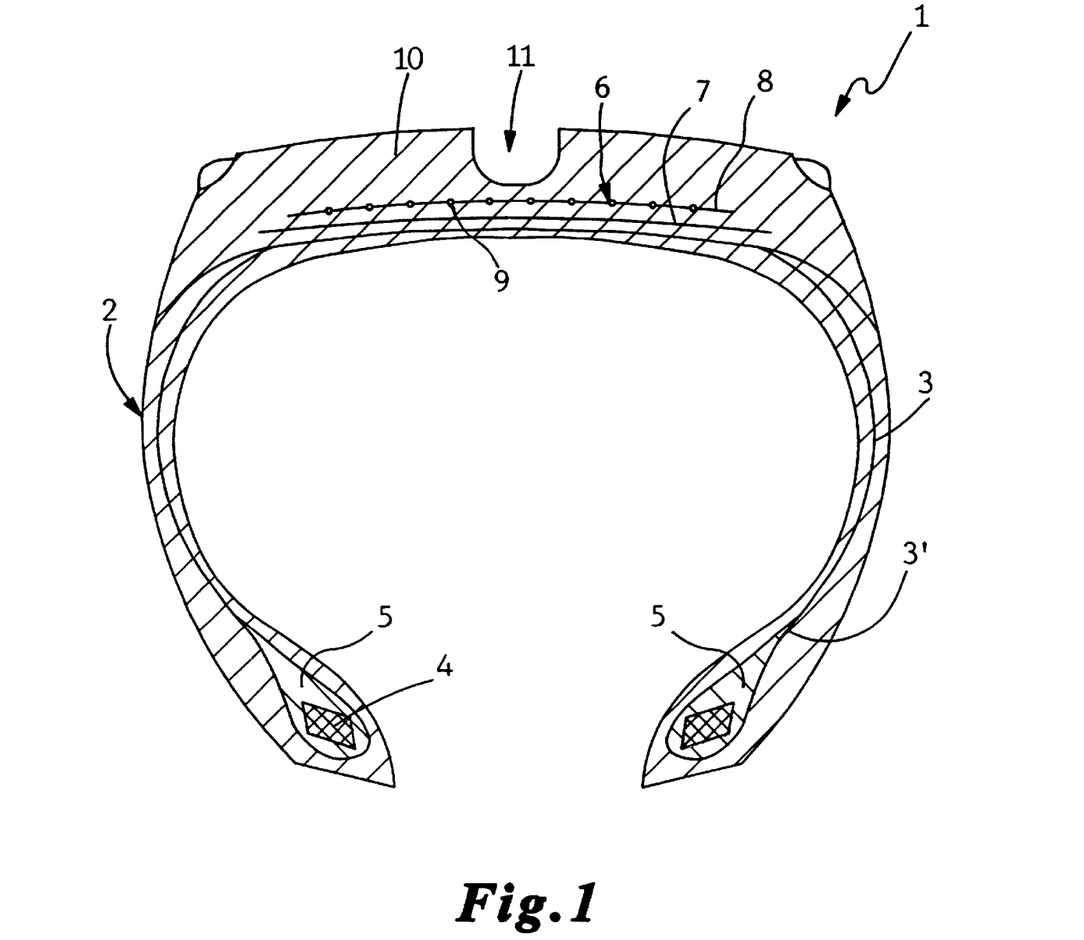
FIG. 1 shows an axial right section of the profile of a tire in accordance with the invention in a use condition, that is mounted to the corresponding mounting rim (not shown) and inflated to the rated work pressure, in the absence of load.

FIG. 1 shows a generic tire structure, which is common both to the tire of known type and to the tire in accordance with the invention: the differences between the tires and the respective manufacturing methods will be illustrated in detail in the following description.

Tire 1 comprises a carcass 2 of a strong structure formed of at least one ply 3 of rubberized fabric, the ends of which are each turned up about an anchoring core 4, which is provided with a rubber filling 5 on its radially outer surface. Preferably the turned-up flaps 3' of the carcass ply extend radially outwardly along at least part of the side of said filling.

As known, the tire area comprising the anchoring core 4 and filling 5 forms the tire bead intended for anchoring the tire to a corresponding mounting rim (not shown).

Disposed on the carcass in known manner is a tread band 10 provided with a raised pattern and designed for carrying out the rolling contact of the tire with the ground.

The tread pattern may comprise a plurality of ribs and/or blocks separated from each other by corresponding grooves directed both circumferentially and transversely, said ribs and/or blocks being optionally provided with different cuts and fins or lamellae. These components of the tread pattern may follow configurations well known to those skilled in the art.

Tire 1 further comprises a belt structure 6 disposed crown-wise to carcass 2, interposed between the carcass and tread band, substantially extending from one tire sidewall to the other. The belt structure is as wide as the tread band, and it comprises two radially superposed layers 7, 8 of preferably metallic reinforcing cords, parallel to each other in each layer and crossed with those of the adjacent layer with respect to the equatorial plane of the tire. Radially outermost layer 9 of reinforcing cords, preferably of textile material and more preferentially of a heat-shrinkable material (e.g. nylon) oriented at substantially 0', extends in a circumferential direction.

For the sake of simplicity, and for better understanding the invention, FIG. 1 shows a tire having a tread band that comprises one circumferential groove or cavity 11 alone. The center line plane of the tread band is coincident with the equatorial plane of the tire, and the different blocks and grooves that may be present on the tread band are omitted.

The main function of groove 11 is that of collecting and ejecting water which stays between the tire and the ground while the tire is running on a wet road.

Groove 11 is a means well known to those skilled in the art for providing a high-performance tire having particular excellent resistance to the aquaplaning effect as well as other desirable features, some of which are in themselves negative towards aquaplaning resistance.

Unfortunately, as described in the discussion of the prior art, tires of this type are subjected to a quick and continuous, irregular wear of the tread band. This wear is concentrated on the area on either side of the circumferential groove.

In accordance with the invention, the Applicant has understood that such an irregular wear, impossible to eliminate with the usual expedients of the known art, could depend on a deviation of the radially external profile of the tread band from the design value.

The tire cross section (see FIG. 1) has a wide axial area at the groove. In this area, residing between the groove bottom and the belt and providing the underlying cushion, the tread band material is much thinner than the material of the band on the groove sides. .

Due to the reduced amount of material at the groove, this tread area, extending along the entire circumferential distance of the tire, has a reduced resistance to deformation. As a result, the corresponding belt portion, due to the thrust action of the inflating pressure, tends to expand to a greater degree than the side portions. Thus, the groove edges and the adjacent tread band portions are pushed outwardly so that they take a profile radially more external than the design profile.

Figure 2:
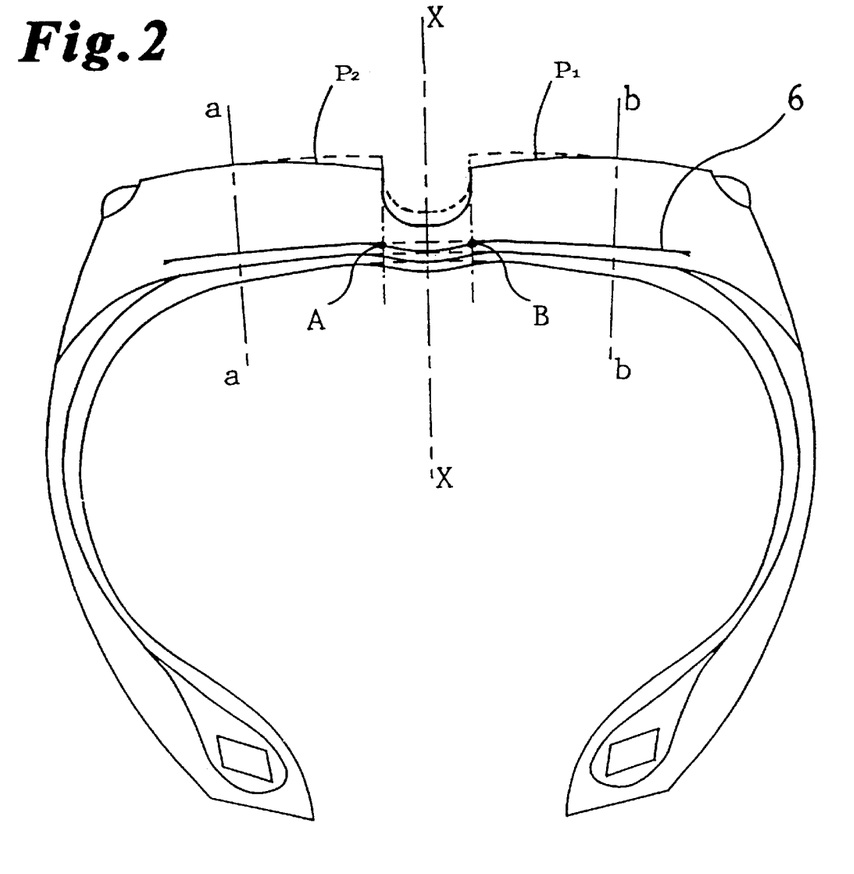
FIG. 2 shows, with the same references as in FIG. 1, the profile of the tire in accordance with the invention under two different conditions, i.e. a non-operating condition in solid line and a use condition in chain line, respectively.
Figure 3:
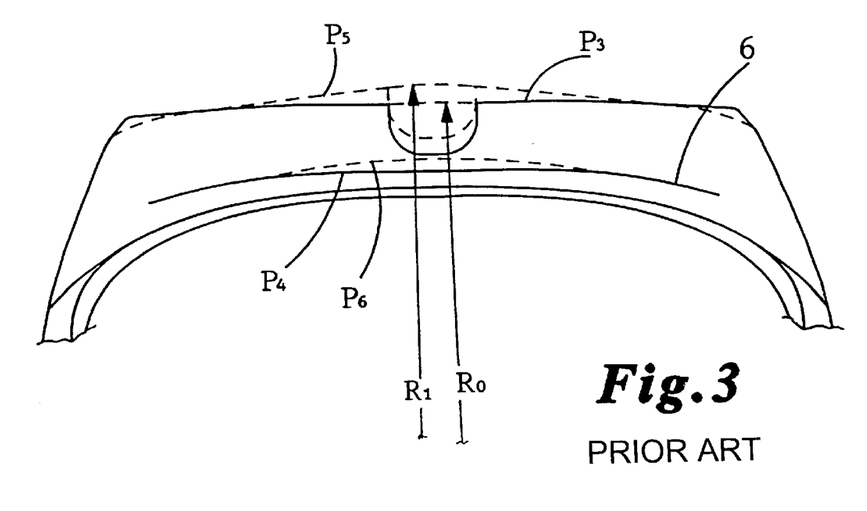
FIG. 3 shows the profile of a known tire in the crown portion alone, under the same conditions as in FIG. 2, i.e. a non-operating condition in solid line and a use condition in chain line, respectively.

This phenomenon and the advantageous results achieved by the invention are shown in FIGS. 2 and 3. In these figures and in the following ones the belt structure is graphically shown by a single line 6.

Shown in FIG. 2 in solid line is the profile ($P_1$) of a tire in accordance with the invention after extraction from the vulcanization mold and under deflated conditions. The chain line depicts the profile ($P_2$) of the tire in its final or use configuration after it has been mounted to a corresponding rim and inflated to the work pressure, in the absence of load.

FIG. 3, showing the crown portion of a known tire, highlights in solid line, the external profile ($P_3$) of the tread band and the profile (N) of the underlying belt 6 for the tire in a deflated condition. The corresponding profiles ($P_5$) and ($P_6$) under use conditions and in the absence of load are shown by the chain line. From a comparison one can clearly see the particular expansion of the tread at the area about the circumferential groove 11 to which the known tire is submitted under working conditions. The deviation between the two profiles is apparent over the whole width of the tread band; in particular, as seen at the tire shoulder area, profile $P_5$ may be radially internal to profile $P_3$.

FIG. 3 depicts not only the cause of the uneven wear, but also why the cause is not eliminated by the known solutions of the state of the art. As the elastomeric material portion included between profile $P_5$, and profile $P_3$ (FIG. 3) is abraded, new material is exposed to abrasion due to the belt expansion caused by the inflating pressure and due to the progressive thinning of the tread band material in this area.

FIG. 2 depicts the fundamental feature of the invention, which consists of a tire structure that upon passing from a deflated state to an inflated state possesses a modified radially external tread band profile of the tread band. This modification of the external tread band profile ensures that the final profile under inflated conditions is within the predetermined design limits, even in the presence of localized variations in the thicknesses of the tread band.

Under non operating conditions, and more particularly in its molding condition, the inventive tire exhibits two distinct circumferential sections a—a and b—b of maximum diameter. Each section is located in a respective tread half at the divergence points between the profiles $P_1$. and $P_2$. The intermediate sections between these two sections a—a and b—b are of lower diameter.

Under use conditions, these two sections a—a and b—b converge on the equatorial plane X—X where, due to the presence of the central groove, the diameter can be determined by extrapolation of the tread profile in axial right section.

In the prior art, tires are known that show two distinct circumferential sections of maximum diameter under deflation conditions. These sections, though, due to the presence of a belt structure of a quite traditional type, remain substantially unchanged even when the tire is in its use condition. In contrast, disappearance of these two distinct sections once the tire is inflated indicates that the tire is one in accordance with the present invention.

Figure 4:
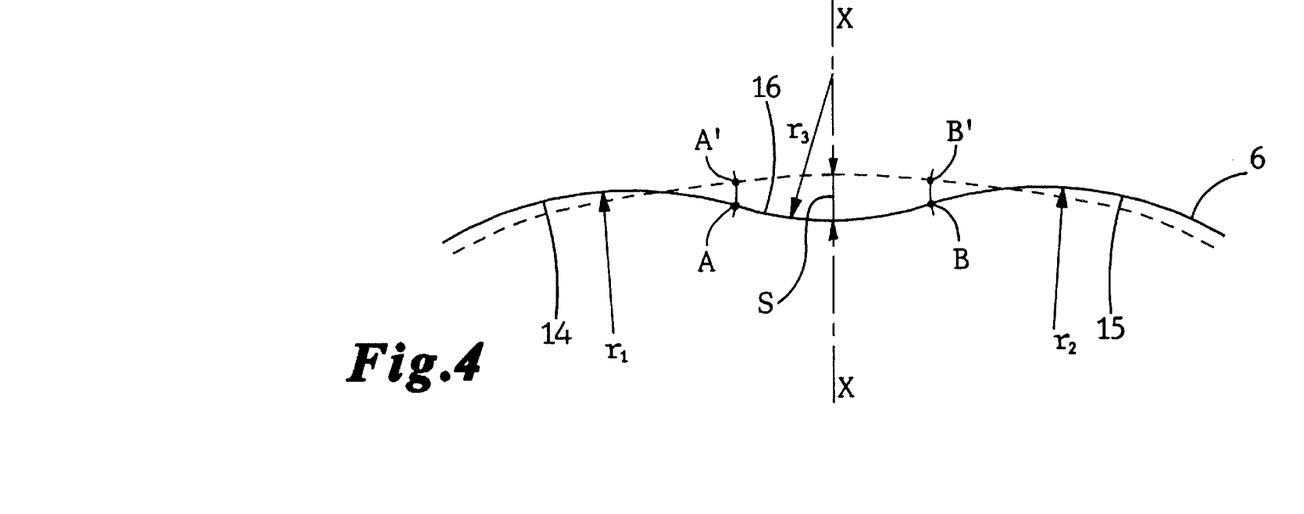
FIG. 4 is a diagrammatic and partial profile in right section of the tire belt in accordance with the invention, under the two different conditions shown in FIG. 2.

As shown in FIG. 4, the tire of the present invention has a particular belt structure configuration when coming out of the mold. In this configuration, the tread profile and the profile of the underlying carcass ply match. More particularly, the tire belt 6 of the invention (FIG. 4) under deflated conditions, has a configuration (shown in solid line) comprising three distinct portions, respectively referred to as first (14) and second (15) portions, disposed laterally of the groove 11, and third portion (16) in the middle, at an intermediate position between the first and second portions.

The side portions 14 and 15 are outwardly convex and are each identified by a respective radius of curvature, $r_1$, and $r_2$, preferably of having substantially identical size length each other, and by respective distinct centers of curvature.

The central portion 16 is outwardly concave and is identified by a different radius of curvature $r_3$, the center of which in this case lies in the equatorial plane.

Highlighted on the belt profile are points A and B at which reversal of the profile curvature occurs. These points may be in correspondence with the edges of groove 11. Alternately, and preferably, points A and B are not coincident with the edges of groove 11 and lie axially external to the edges of groove 11.

As shown in FIG. 2, upon release from the mold, the tire of the present invention exhibits a diametrical reduction at the central portion of the tread band. As a result, the belt is shifted radially inward relative to the corresponding molding profiles of the known tire (FIG. 3) of same structure and size. The magnitude of the diametrical reduction corresponds to the expansion to which the known tire experiences on passing from the molding condition to the inflation condition when mounted on the rim. This particular belt configuration, in accordance with the invention, overcomes the drawback of localized wear as displayed by prior art tires.

Actually, on passing from the deflated-tire condition (or rest condition) to the use condition, the inflating pressure expands the whole belt radially outwardly. In particular, the greater expansion of the central belt portion 16, caused by the presence of groove 11, gives rise to a reversal of curvature of said central portion and a shifting of points A and B to points A' and B' on the predetermined inflation profile (chain line). Thus, the external tread profile changes from configuration $P_1$. shown in FIG. 2 to configuration $P_2$ shown in the same figure and corresponds to the tire profile under use conditions. In this situation, the inflating pressure cannot cause further localized expansion of the tread at the groove area, because the belt expansion has been completely exhausted in bringing the profile of its central portion from a concave rest configuration of lower diameter to the convex use configuration of greater diameter.

Therefore, in the tire of the present invention, near groove 11 there are no longer tread areas subjected to greater expansion and therefore greater specific pressure against the ground than the remaining side portions. Consequently tread abrasion takes place evenly over the whole surface of the ground-contacting area. This tire successfully overcomes the drawbacks of rapid and continuous localized wear characteristic of known tires.

The tire belt in accordance with the invention must be manufactured in a manner adapted to provide the variable curvature configuration which varies between two opposite, concave and convex, positions. In particular, the belt features taken as a whole are capable of storing, during the tire molding, elastic energy due to the imposed deformation of the central belt portion. As a result, energy is released during the deformation in the opposite direction imposed by the inflating pressure, thereby facilitating the curvature reversal and enabling the tire belt to easily achieve its work disposition.

In a convenient embodiment represented by a prototype tire, size 195/60 R 15 made by the Applicant, the tire comprises a belt structure provided with two radially superposed layers of a rubberized fabric reinforced with metallic cords of formation 10. This fabric consists of 1 strand of 3 steel wires of a diameter preferably included between 0.20 and 0.32 mm, in this case 0.28 mm. The cords in the fabric have a thickness included between 70 and 110 wires/dm, in this case 85 wires/dm, and are preferably oriented at an angle included between 20° and 30° measured crown-wise with respect to the equatorial plane of the tire, in this case 25°. Also, the cords are directed symmetrically with the cords of the adjacent layer.

Disposed at a position radially external to the two layers is a third layer, and preferably two further layers radially superposed, of textile cords. These cords are made of nylon of 1400/1 dTtex and are directed circumferentially to the tire. This third layer is advantageously made up of one or more cords helically wound in one or more layers about the layers of crossed metallic cords.

At the end of the molding step, the reinforcements and belt have the following values for the radii of curvature relating to the three belt portions diagrammatically shown in FIG. 4:—radii of curvature $r_1$ and $r_2$ of the belt side portions are included between 120 and 500 mm,—distance between centers; radii $r_1$ and $r_2$, measured in axial section, parallel to the rotation axis of the tire, are preferably included between 10% and 30% of the belt width, —radius of curvature $r_3$ of the belt portion 16 is preferably included between 20 and 150 mm.

In accordance with a preferred alternative embodiment of the invention, the tire comprises tread stiffening means disposed in the groove 11. This tread stiffening means continuously modifies the curvature reversal of the third belt portion from concave to convex during the tire inflation. This stiffening means offers a resistance to curvature reversal thereby avoiding the occurrence of movements by jerks that could give rise to tearing of the tire in the underlying cushion, or the portion of reduced thickness included between the groove bottom and the belt. To perform this function, there are several different solutions for reinforcing the groove 11. Of these solutions, those resulting from particular geometries of the tread band within the groove itself are preferred.

Figure 5:
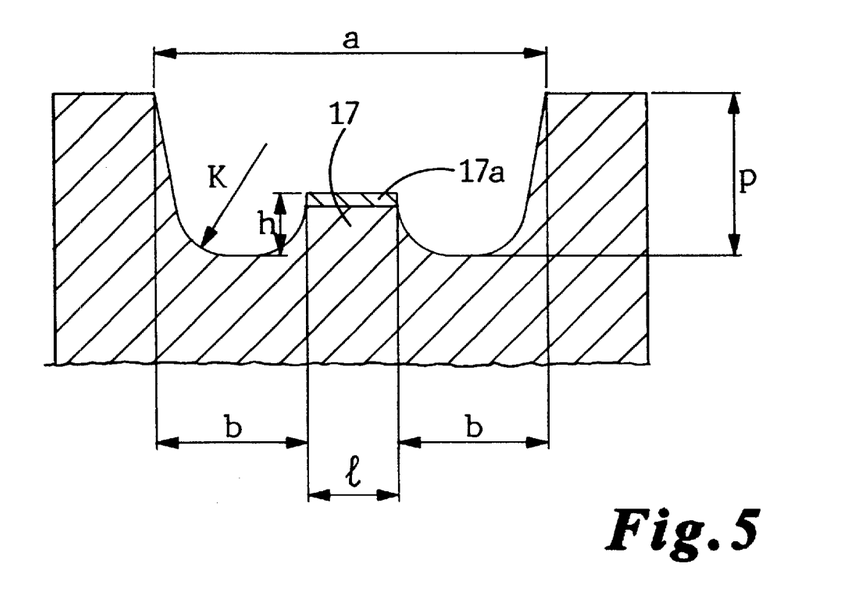
FIG. 5 is a view in right section of a rib in the circumferential groove of the tire tread band in accordance with the invention.

In a preferential solution shown in FIG. 5, the groove 11 comprises a circumferentially continuous rib 17, extending in cantilevered fashion from the groove bottom, preferably arranged symmetrically to the center line plane of said groove.

Preferably rib 17 is of a shape and thickness adapted to avoid formation of a hinge at the groove bottom. Such a hinge would provide a concentration point for deformation connected with the bending movement reversing the belt curvature, and it would bring about the well known disadvantages.

The rib 17 can be made of an elastomeric material, preferably of the same blend as the tread band or, alternatively, of a different blend that may optionally be filled with inert reinforcing fillers of the type usually used in tires. Examples of these inert reinforcing fillers include short aramide fibres of fibril structure, commercially known as aramide pulp, or magnetic powders that allow the rib to be used as a medium for recording codes and various information of technical or commercial kind, relating to the tire.

The rib 17 comprises a head portion of flat or even wedge-shaped or curvilinear configuration, preferably connected to the groove bottom by curvilinear flanks in the form of an arc of a circle. Preferably, the two portions of the groove bottom separated from each other by the rib are connected to rectilinear flanks defining the groove by means of curvilinear connections. Advantageously, the rib head 17a can be made of a colored blend, optionally of the fluorescent type, for different purposes such as aesthetic, commercial (such as a trademark) or safety purposes. In a safety oriented role, the colored rib can indicate the maximum admissible wear limit for the tread and thereby indicate when aquaplaning danger is present. This solution can be applied to the tire independently of the presence of a belt in conformity with the invention.

In the Applicant's above mentioned prototype tire, the groove in FIG. 5 has a maximum width "a" of 20 mm (i.e. corresponding to 12% of the tread width, and preferably included between 10% and 18% of said width), a depth "p" of 8.5 mm and preferably included between 7 and 9.5 mm, a rib height "h" from the groove bottom of 3 mm and preferably included between 1.5 and 4 mm, in which the p/h ratio between the depth of said groove and height of said rib has a value preferably included between 1.75 and 6.5. The groove also has a width "l" of the rib head of 4.6 mm and preferably included between 3 and 8 mm. Also, the arcs for connection between the groove walls and rib walls preferably have a radius "K" of 2.5 mm and preferably at least 2 mm.

The underlying cushion thickness, that is the minimum thickness of the material interposed between the groove bottom and the facing surface of the radially outermost belt layer is 2 mm, and preferably included between 1 and 3.5 mm.

As an alternative solution to the above, the stiffening means for the groove could comprise a series of ribs, all of same shape or of different shape, departing in cantilevered fashion from the bottom. For example, this series of ribs can be disposed either in a single circumferential line or in several circumferential lines in side by side relationship and optionally staggered relative to each other.

Figure 6:
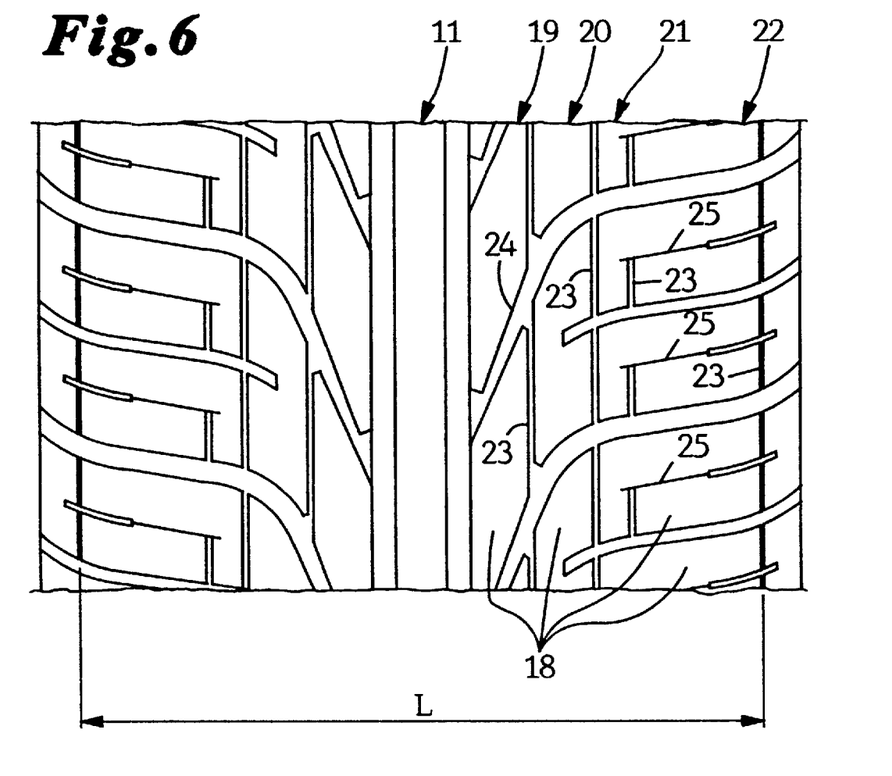
FIG. 6 is a partial view of a preferred tread pattern in the tire of the invention.

FIG. 6 shows a specific embodiment of the invention in a high-performance tire provided with a pattern of the directional type. The present invention advantageously applies to any pattern type, not only a directional type but also a symmetric or asymmetric type, having blocks or ribs. The invention is especially applicable, although not exclusively, when provided with large circumferentially-directed grooves. The specific usefulness of the invention is that of eliminating an early wear concentrated on the areas close to said groove edges.

In the present description, reference has been always made to a groove 11 extending in register with the equatorial (center line) plane of the tire so that the center of curvature of the central concave portion 16 of the belt structure is shown lying in said plane. However said groove can extend also along one or more circumferential planes that do non coincide with the equatorial plane of the tire. In such a case, the centers of curvature of the three different portions too (14, 15, 16) will undergo corresponding shifting in the axial direction.

The drawing in FIG. 6 is a convenient elaboration of the tread pattern in a symmetric version, disclosed in the Applicant's patent application MI 93 A 00 1119 of May 31, 1993, now European Patent EP 0 627 332 B1, for the purpose of specialized use in marked sports utilizations.

The pattern comprises, in combination with the central groove 11 preferably provided with rib 17, a plurality of transverse grooves 24 extending axially on both sides of the equatorial plane and in mirror image relationship with respect to said plane, between the central groove 11 and the corresponding tread end. These transverse grooves are greatly inclined in the longitudinal direction close to the central groove and are directed almost axially on the side tread portions. The transverse grooves, in combination with a plurality of longitudinal grooves 23 extending circumferentially to the tire and transverse slits 25, define a plurality of blocks 18 distributed in circumferential parallel rows 19, 20, 21, 22.

Preferably, each of the rows comprises at least as many blocks as the number of blocks present in the row disposed consecutively thereto in side by side relation towards the equatorial plane of the tread. It is apparent from the foregoing that the symmetric pattern of said patent application can be associated in a particularly advantageous fashion with the belt structure in accordance with the invention. In conjunction with the tire of the present invention, these patterns achieve a high resistance to the aquaplaning effect, increase traction power, provide a low abrasion capability, reduce rolling resistance, and reduce noise while running.

One can intuitively easily understand how an accelerated wear of the central portion of said patterns, particularly promoted by the tapering configuration of the block edges in the central rows would make the corresponding tire seriously deficient in relation to the intended type of use, in addition to involving an economic loss resulting from the reduced lifetime of same.

To accomplish the invention, molding is carried out according to a particular profile of the belt structure. For the purpose of achieving the desired effects, the geometrical size of the profile must be calculated in advance.

In accordance with the invention, the molding profile for the tire is imposed by assigning a specific profile in cross-section to the vulcanization mold surface. The vulcanization mold, taken as a whole, is of a known and traditional type. Therefore, the specific details of the vulcanization mold that are not essential in comprehending the present invention have been omitted. As stated earlier, the mold comprises two axially opposite cheeks corresponding to the tire sidewalls, and an intermediate annular portion disposed between the two cheeks. For molding of the tread pattern, the annular portion is provided on its radially inner surface with a matrix having a plurality of ribs projecting in a raised configuration from a bottom surface.

Figure 7:
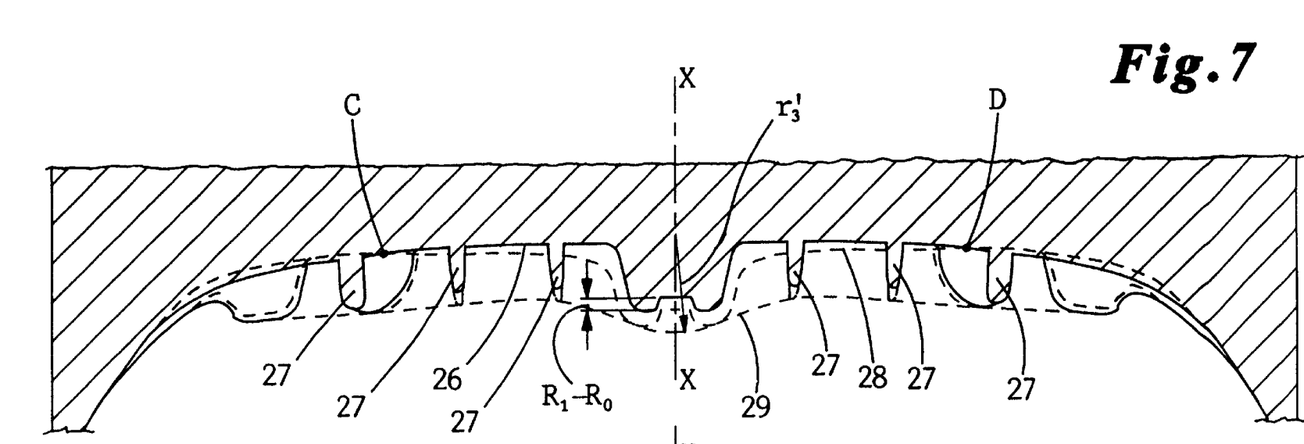
FIG. 7 is an axial right section of the profile of a mold for manufacturing a tire of known type (in solid line), the profile of a mold for manufacturing a tire in accordance with the invention (in dotted line), and the profile of the surface tangent to the rib ridges in the mold in accordance with the invention (in chain line).

Shown in FIG. 7 is the cross section of this mold. The use of a sector mold of the centripetal type is assumed but is not meant to limit the type of mold of the present invention.

There is the problem of establishing the amount of radial deviation between the traditional matrix profile and the profile to be assigned to the matrix of a mold in accordance with the invention to achieve the desired belt profile. The process of the invention is therefore carried into effect as follows.

As already said, the tire structure is a structure known per se; it is herein pointed out that the tire is also assembled in the traditional way following the known methods and with the usual apparatuses of the state of the art, until a green tire ready for vulcanization is obtained.

Thus, a known tire is prepared in the stated usual manner. The tire is subsequently vulcanized, to provide the final tread pattern, in a service mold having geometrical sizes that are calculated in the traditional way. It is apparent that the final tire profile under use conditions also depends on the overall features of the tread pattern thereof.

The profile 26 of the radially inner surface of this mold is denoted by a solid line in FIG. 7. In the same FIG. 7, ribs designed to form cavities and grooves in the tread pattern are identified as element 27. In addition, highlighted by a dotted line is the profile 28 of the mold as modified in accordance with the invention. Chain line 29 indicates the profile of the surface tangent to the rib ridges according to profile 28. The determination of the inner profile for the new mold takes place as follows.

The known tire vulcanized in a service mold is mounted to the respective rim and inflated to the exercise pressure.

Detection of the radially external profile ($P_5$ in FIG. 3) of the tread band is carried out from one end to the other, thereby determining the actual tire expansion (or shrinkage, if present), that is the punctual deviation value of this profile, point by point, along its axial extension, from the known theoretical profile ($P_3$ in FIG. 3) resulting from the design.

Then the deviation values are used for construction of the final tire vulcanization mold; in other words, these values are negatively reproduced on the corresponding points of the matrix surface (bottom surface) of the service mold, thereby determining the new radially internal profile 28 of the bottom surface of the corresponding final vulcanization mold.

Generally, it is sufficient to measure R, the radius in the known tire inflated to its use pressure, at the equatorial plane. Next, the difference between this radius and radius $R_0$ of the same known tire under non-operating conditions is determined. The value S of the $R_1-R_0$ difference is reproduced on the radially inner surface of the service mold at the equatorial plane. Next, this point at the equatorial plane is joined (while keeping unchanged the geometry and sizes of the ribs encountered along the axial extension of the profile) to two other points (C, D), one on each side of the equatorial plane, at which deviation between the two profiles marked by $R_1$ and $R_0$ is zero. From these points, the new radially inner profile of the final mold is drawn. At this point the new inner profile of the mold is completely defined.

Preferably at at least three distinct points, one central point at the equatorial plane and two side ones, for example at the groove edges or disposed axially externally of said edges. More preferentially, the process will make use of the radius measurement at five points, two of which are located close to the tread ends.

The process is put into practice by carrying out vulcanization in the service mold and inspecting a plurality of known tires, so as to construct a table of values from which the average final value to be used will be drawn. In this manner the consequences of accidental errors and fortuitous disturbances that could alter the results of a single detection can be eliminated. The process in accordance with the invention will be preferably followed for preparing the final molds for each different tire size.

The new profile of the matrix bottom surface consists of two distinct and axially opposite concave side portions in respect of the equatorial plane of the mold. Each of the portions is defined by a radius of its own and a center of curvature of its own, in which the respective radii $r'_1$ and $r'_2$ are preferably identical with each other. The profile of the surface tangent to the rib ridges according to the new profile has a central portion, included between said side portions, which is radially inwardly convex. Thus, the concavity of this portion faces the bottom surface, identified by a radius $r'_3$ relative to the envelope arc of the rib designed to form the groove 11 in the tread band.

In the described example, the following values of the radii of curvature $r'_1$, $r'_2$, $r'_3$ in the matrix have been found: $r'_1=r'_2$ in the range between 150 mm and 300 mm, $r'_3$ in the range between 20 mm and 150 mm.

Thus the final molds can be built up and the production of tires in accordance with the invention making use of these molds can be carried out.

During the tire molding and vulcanization step, carried out in a known way by blowing fluid under pressure into the tire held inside the vulcanization mold, the greater penetration of the inner mold profile due to the value of lowering $R_1-R_0$ relative to the mold of the known art gives rise to a compression on the corresponding belt portion. This compression results in formation of a hollow or concave portion 16, visible in FIGS. 2 and 4, the depth of which measured along its center line plane is substantially the same as the distance S assigned to the inner profile of the known mold, in accordance with the described process.

At the end of the cycle, a vulcanized tire having the mold configuration delimited by profile 28 of FIG. 7 in turn corresponding to profile $P_1$ of FIG. 2 (except for the rib 17 not shown in FIG. 2) is pulled out of the mold. The tire keeps its molding shape until use, and takes it again when it is deflated.

After mounting the tire to the corresponding rim, air under pressure is inflated into the closed space between the rim and the tire to provide the use condition. During inflation, the air pressure pushes against the whole belt surface and gradually reverses the convexity of the central belt portion. This action is facilitated by the return of the previously-stored elastic energy of the deformed metal wires in the belt.

The ranges of variability of the specific physical and geometrical parameters cited in the preceding description of a particular embodiment of the tire in accordance with the invention represent critical value ranges for an optimal achievement of the advantages resulting from the invention.

The work configuration of the belt is a stable configuration (FIG. 4) identified by a curvature continuously convex towards the outside over its whole extension.

The tread profile follows the stable belt disposition and is identified by convex curvatures as well over its whole extension. Preferably, the tread profile has two radii of curvature $rb_1$, and $rb_2$, identical with each other on the side portions of the band, and a third radius of curvature $rb_3$ the center of which is along the equatorial plane. The value of the radius of curvature $rb_3$ is preferably greater than that of the side portions, with a ratio value $rb_3/rb_1=rb_3/rb_2$ included between 1 and 5. This profile is the profile $P_2$ in FIG. 2 which is greatly different from the profile of known tires ($P_3$ in FIG. 3) after inflation of the tire mounted on the respective rim. In particular, the profile of the tire profile of the present invention is a substantially flat profile at the area surrounding the groove 11. In contrast to prior art tires, this profile ensures a uniform specific pressure over the whole ground-contacting area of the tire. Consequently, the tire of the present invention overcomes the problems of localized and early wear of the tread, which is prevalent among known tires.

It will be finally recognized that the foregoing description is for purposes of illustration only and therefore a person skilled in the art, after understanding the invention as above disclosed, will be able to carry out modifications, variations and replacements of the variables associated with the present invention in order to meet specific and contingent requirements for application of same.

What is claimed is:

1. A tire for motor-vehicle wheels comprising a toroidal carcass provided with axially opposite sidewalls and beads for anchoring of said tire to a corresponding mounting rim, a tread band disposed crown-wise to said carcass and a belt structure interposed between said carcass and tread band, axially extended in a continuous manner between said sidewalls, said tread band being molded with a raised pattern having a circumferential groove, wherein in the absence of load and inflating pressure, said belt structure, seen in cross section in the plane containing the tire axis, has:

an axial profile comprising three distinct portions, two side portions referred to as first and second portions, and one central portion respectively, said central portion being interposed between said side portions;

said side portions being concave at a radially internal position, in which the concavity is defined for each side portion by a respective center and a respective radius of curvature, said central portion being concave at a radially external position, the concavity center of said central portion lying in the center line plane of said circumferential groove, in which the depth of said radially external concavity is canceled under the effect of the normal inflating pressure of the tire, and the depth of the radially external concavity corresponds to an amount of expansion which the tire mounted to said corresponding rim and subsequently inflated would undergo if said belt structure viewed in an axial cross section were defined by a continuously concave profile at a radially internal position.

2. A tire as claimed in claim 1, wherein the center line plane of said groove is coincident with the equatorial plane of the tire.

3. A tire as claimed in claim 2, wherein the radii of curvature of said internally concave side portions are substantially identical with each other and have a value included between 120 and 500 mm.

4. A tire as claimed in claim 2, wherein the radius of curvature of said externally concave central portion is of a value included between 20 and 150 mm.

5. A tire as claimed in claim 2, wherein the thickness of said tread band at the equatorial plane is included between 1 and 3.5 mm.

6. A tire as claimed in claim 2, wherein the ratio of said groove depth to the thickness of the underlying tread band portion is included between 2 and 10.

7. A tire as claimed in claim 1, wherein the width of said groove is included between 10% and 18% of the width of said tread band.

8. A tire as claimed in claim 1, wherein said tire further comprises stiffening means for said tread band disposed in said groove.

9. A tire as claimed in claim 8, wherein said stiffering means comprises at least one rib extending in cantilevered fashion from the bottom of said groove.

10. A tire as claimed in claim 9, wherein a head of said at least one rib is made of a blend, for aesthic and/or saftey purposes, for signailing begining of aquaplning danger and/or the maimum permisible wear limit for the tread.

11. A tire as claimed in claim, wherein said at least one rib comprises a single, circumferentially continuous rib arranged symmetrically to the center line plane of said groove.

12. A tire as claimed in claim 11, wherein the ratio of said groove depth to the height of said single rib is included between 1.75 and 6.5 .

13. A tire as claimed in claim 10, characterized in that the head of said at least one rib is made of a colored blend, for aesthetic and/or safety purposes, for signalling beginning of aquaplaning danger and/or the maximum permissible wear limit for the tread an axial profile comprising three distinct portions, two side portions referred to as first and second portions, and one central portion respectively, said central portion being interposed between said side portions; defined for each side portion by a respective center and a respective radius of curvature, said central portion being concave at a radially external position, the concavity center of said central portion lying in the center line plane of said circumferential groove, in which the depth of said radially external concavity is canceled under the effect of the normal inflating pressure of the tire, and an axial distance between the centers of the side portion radii of curvature measured parallel to the axis of rotation of the tire is included between 10% and 30% of the belt width.

* * * * *

UNITED STATES PATENT AND TRADEMARK OFFICE
CERTIFICATE OF CORRECTION

PATENT NO. : 6,305,450 B1
DATED : October 23, 2001
INVENTOR(S) : Romano Guermandi Page 1 of 1

It is certified that error appears in the above-identified patent and that said Letters Patent is hereby corrected as shown below:

<u>Column 14,</u>
Line 11, "aesthic" should read -- aesthetic --.
Line 11, "saftey" should read -- safety --.
Line 12, "signailing begining" should read -- signalling beginning --.
Line 12, "aquaplning" should read -- aquaplaning --.
Line 13, "maimum permisible" should read -- maximum permissible --.
Line 14, "claim," should read -- claim 10, --.

Delete lines 21 though 25 (the preamble of claim 13) in its entirety and insert the following preamble therefor:
-- A tire for motor-vehicle wheels comprising a toroidal carcass provided with axially opposite sidewalls and beads for anchoring of said tire to a corresponding mounting rim, a tread band disposed crown-wise to said carcass and a belt structure interposed between said carcass and tread band, axially extended in a continuous manner between said sidewalls, said tread band being molded with a raised pattern having a circumferential groove, wherein in the absence of load and inflating pressure, said belt structure, seen in cross section in the plane containing the tire axis, has: --.

Line 30, "defined for each side portion" should be a paragraph and should read:
-- said side portions being concave at a radially internal position, in which the concavity is defined for each side portion --.

Signed and Sealed this

Fourteenth Day of May, 2002

*Attest:*

JAMES E. ROGAN
*Director of the United States Patent and Trademark Office*

*Attesting Officer*